(12) United States Patent
Avni (10) Patent No.: US 7,771,371 B2
(45) Date of Patent: Aug. 10, 2010

(54) SPORTS SHOE WITH SENSING AND CONTROL (75) Inventor: Arik Avni, Meitar (IL)

(73) Assignee: Andante Medical Devices Ltd, Omer (IL)

(*) Notice: Subject to any disclaimer, the term of this patent is extended or adjusted under 35 U.S.C. 154(b) by 179 days.

(21) Appl. No.: 11/573,444

(22) PCT Filed: Aug. 11, 2005

(86) PCT No.: PCT/IL2005/000873

§ 371 (c)(1),
(2), (4) Date: Aug. 3, 2009

(87) PCT Pub. No.: WO2006/016369

PCT Pub. Date: Feb. 16, 2006

(65) Prior Publication Data

US 2009/0293319 A1  Dec. 3, 2009

Related U.S. Application Data (60) Provisional application No. 60/600,763, filed on Aug. 11, 2004.

(51) Int. Cl.
A61B 5/103 (2006.01)
A61B 5/117 (2006.01)

(52) U.S. Cl. .................... 600/592; 600/595

(58) Field of Classification Search .......... 600/587, 600/592, 595
See application file for complete search history.

(56) References Cited

U.S. PATENT DOCUMENTS 3,791,375 A  2/1974  Pfeiffer
3,881,496 A  5/1975  Vredenbregt et al.
3,974,491 A  8/1976  Sipe
4,426,884 A  1/1984  Polchaninoff
4,734,034 A  3/1988  Maness et al.
4,745,930 A  5/1988  Confer
4,813,436 A  3/1989  Au
4,856,993 A  8/1989  Maness et al.
5,033,291 A  7/1991  Podoloff et al.
5,107,854 A  4/1992  Knotts et al.

(Continued)

FOREIGN PATENT DOCUMENTS

DE  4205796  9/1993

(Continued)

OTHER PUBLICATIONS

U.S. Appl. No. 60/600,763.

(Continued)

*Primary Examiner*—Max Hindenburg
*Assistant Examiner*—Jonathan M Foreman
(74) *Attorney, Agent, or Firm*—Fish & Richardson P.C.

(57) ABSTRACT

Apparatus (20) is provided for improving athletic performance of a user, including a flexible insole (40), adapted for insertion into a shoe, the insole shaped so as to define one or more chambers (22, 24). The apparatus also includes a stimulator (50) and a control unit (30). The control unit is adapted to detect respective pressures in the chambers, and to drive the stimulator to apply a stimulation to the user responsive to the detected pressures and a desired parameter of athletic performance.

9 Claims, 3 Drawing Sheets

U.S. PATENT DOCUMENTS

| | | | |
|---|---|---|---|
| 5,253,435 | A | 10/1993 | Auger et al. |
| 5,406,719 | A | 4/1995 | Potter |
| 5,642,096 | A | 6/1997 | Leyerer et al. |
| 5,813,142 | A | 9/1998 | Demon |
| 6,174,294 | B1 | 1/2001 | Crabb et al. |
| 6,273,863 | B1 | 8/2001 | Avni et al. |
| 6,298,314 | B1 | 10/2001 | Blackadar et al. |
| 6,360,597 | B1 | 3/2002 | Hubbard, Jr. |
| 6,398,740 | B1 | 6/2002 | Lavery et al. |
| 6,430,843 | B1 | 8/2002 | Potter et al. |
| 6,493,652 | B1 | 12/2002 | Ohlenbusch et al. |
| 6,539,336 | B1 | 3/2003 | Vock et al. |
| 6,611,789 | B1 | 8/2003 | Darley |
| 6,646,643 | B2 | 11/2003 | Templeman |
| 7,355,519 | B2 * | 4/2008 | Grold et al. .............. 340/573.7 |
| 2003/0009913 | A1 | 1/2003 | Potter et al. |
| 2006/0005425 | A1 * | 1/2006 | Votolato ..................... 36/7.3 |

FOREIGN PATENT DOCUMENTS

| | | |
|---|---|---|
| WO | 01/36051 | 5/2001 |
| WO | 2004/008095 | 1/2004 |

OTHER PUBLICATIONS

U.S. Appl. No. 60/526,814.

* cited by examiner

SPORTS SHOE WITH SENSING AND CONTROL

CROSS-REFERENCES TO RELATED APPLICATIONS

This application is a U.S. national phase entry of PCT/IL2005/000873 filed Aug. 11, 2005, which claims priority from U.S. Provisional Patent Application 60/600,763, filed Aug. 11, 2004, which is assigned to the assignee of the present application and is incorporated herein by reference.

FIELD OF THE INVENTION

The present invention relates generally to sports training and rehabilitation systems, and specifically to adaptive weight-bearing adaptive training and rehabilitation systems.

BACKGROUND OF THE INVENTION

There are a number of insole foot force sensing devices currently used for measuring force on the foot. For example, U.S. Pat. No. 4,745,930 to Confer, which is incorporated herein by reference, describes a flexible force sensing insole which incorporates multiple electrical switches which close after a certain threshold level of force is imposed on the insole. U.S. Pat. No. 5,033,291 to Podoloff et al., which is incorporated herein by reference, describes a force sensing device which uses a plurality of intersecting electrodes. The electrodes act as open circuit switches at each intersection which close when force is applied to the insole at that intersection location. The resistance between the two electrodes varies with the amount of force applied. U.S. Pat. No. 4,426,884 to Polchaninoff, which is incorporated herein by reference, describes a flexible force sensor which acts as an open circuit, closing with the application of force on the sensor and having resistance that varies with the amount of force.

Foot force measurement devices typically convert mechanical force into a suitable signal medium, usually electrical signals. The devices thus can be conveniently categorized according to the type of sensor used to convert changes in mechanical force to changes in electrical signals. These types of sensors include switches, strain gauge sensors that respond to mechanical deformation, single direct electronic force sensors, multiple direct electronic force sensors with random spacing, and multiple direct electronic force sensors with regular spacing.

U.S. Pat. No. 4,813,436 to Au, which is incorporated herein by reference, describes a motion analysis system that incorporates markers which are secured at various joints of a subject's body, and pressure-sensitive shoes or insoles which are worn by the subject. The subject is caused to perform motion such as walking or running. While performing this motion, the subject is televised by means of two video cameras. A display is provided which indicates the pressure applied to the subject's foot while performing the motion, as measured by the pressure-sensitive insoles. The remaining data supplied by the video cameras is processed to present various displays showing the gait, the angular position of the various joints of the subject, and various other information indicative of the particular walking characteristics of the subject. The data produced and processed by the system enables a practitioner to compare the subject's walking gait to that of a normal user.

U.S. Pat. Nos. 4,734,034 and 4,856,993 to Maness et al., which are incorporated herein by reference, describe a contact sensor for detecting points on a grid where the sensor is being contacted on opposing sides by teeth surfaces or other contacting points. The contact sensor includes two sets of parallel electrodes which are each formed of a thin, flexible supporting sheet. The electrodes are coated with a thin, resistive coating. Two such electrode structures are oriented at approximately right angles to create a grid where the intersecting electrodes cross separated by the resistive coatings. The resistive coatings may be made from conventional resistive inks and are optionally separated by a separation material, such as talcum or mesh. In the absence of an external force, the material between the electrodes sets provides a high resistance between intersecting electrodes. The composition of the intermediate layer results in a structure which provides a "switching" effect such that the resistance between electrodes is very high where there is no external pressure and changes to a comparatively low value at locations where external pressure is applied by two contacting points or surfaces.

U.S. Pat. No. 3,881,496 to Vredenbregt et al., which is incorporated herein by reference, describes techniques for electrically stimulating leg muscles using an air-filled chamber located in the sole of the shoe beneath the ball of the foot. The chamber is coupled through an air channel or a thin hose and a diaphragm to a microswitch located in the heel. The switch activates an electric pulse generator in synchronism with the normal walking pattern.

U.S. Pat. No. 3,974,491 to Sipe, which is incorporated herein by reference, describes a sensor having a fluid-filled chamber that is a continuous, resilient tube having a circular cross section. The tube is coiled under the heel and the sole of a patient's foot inside a sponge rubber footpad. The footpad is placed between adhesive sheets of flexible, dimensionally stable material such as rubber-coated fabric.

U.S. Pat. No. 3,791,375 to Pfeiffer, which is incorporated herein by reference, describes a remote displacement measuring device that is connected to two units, a heel unit and a toe unit, located in the insole. The units deflect and change their volume in accordance with the amount of load placed thereon. The displacement measuring device is signaled with an electrical alarm to indicate when a predetermined load on the units is reached. The displacement measuring device consists of a single sensor such as, for example, a bellows that measures the combined total displacement from both the heel and the toe unit.

U.S. Pat. No. 6,273,863 to Avni et al., which is assigned to the assignee of the present application and is incorporated herein by reference, describes a portable, self-learning adaptive weight bearing monitoring system for personal use during rehabilitation of orthopedic patients with fractures of the lower extremities. The system includes a flexible insole which is worn inside the shoe. The insole includes pressure and/or force sensor that measure the Ground Reaction Force (GRF) applied at key bearing points under the foot or other portions of the patient's lower extremity. The sensors are, in turn, connected through an A/D converter to a CPU that is connected so as to drive a stimulator that delivers closed-loop sensory stimulation (electrical, mechanical, and/or audio) as feedback to encourage the patient to load the optimal target weight for the limb for which the weight bearing force is being measured. Accurate real-time monitoring of the weight bearing during physical rehabilitation is also provided, and, through the use of closed-loop sensory stimulation, the patient is given continuous feedback for improving rehabilitation.

PCT Publication WO 04/008095 to Avni et al., which is assigned to the assignee of the present application and is incorporated herein by reference, describes a force sensor system for use in monitoring weight bearing on a location. The force sensor system comprises at least one a foot force sensor, a palm force sensor, and a knee force sensor. The foot force sensor comprises a flexible insole containing a plurality of inflatable pockets that are inflated with air or liquid. The palm force sensor and knee force sensor each comprise a wrap to be worn around the palm and knee, respectively. Each wrap comprises a pocket. Each pocket is connected to a tube that, in turn, connects with a pressure sensor and a connector coupling that is remote from the pocket. Each coupling contains a valve. The valve opens to allow inflation and deflation of each inflatable pocket. The pressure sensors measure the air or liquid pressure within each of the inflatable pockets, and convert the corresponding pressure signal into a suitable output signal medium, usually electrical signals. The output signal from the sensors provides accurate real time input data to a weight bearing biofeedback system or to control a stimulator for activation of an electronic orthosis to normalize dynamic gait patterns.

PCT Publication WO 01/36051 to Avni, which is assigned to the assignee of the present application and is incorporated herein by reference, describes a portable, self-learning adaptive weight bearing monitoring system for personal use during rehabilitation of neurological disorders and orthopedic lower limb injuries. The system includes a flexible insole or pad which includes at least one pressure and/or force sensor that measures the weight force applied to at least two monitored locations of at least one of the patient's limbs. The sensors are, in turn, connected through an A/D converter to a CPU that compares the distribution of weight on each monitored location of at least one limb to a target weight distribution. The target weight distribution is preferably based on subjective and objective parameters unique to the patient and the injury of the patient. The CPU is connected so as to drive a stimulator that delivers closed-loop sensory stimulation (visual, mechanical vibration, and/or audio) as feedback to encourage the patient to distribute weight more evenly on all monitored locations of at least one limb. Accurate real-time monitoring of the weight bearing during physical rehabilitation is also provided, and, through the use of closed-loop sensory stimulation, the patient is given continuous feedback for improving rehabilitation.

U.S. Pat. No. 6,360,597 to Hubbard, Jr., which is incorporated herein by reference, describes a gait analysis system that includes a shoe insert for use in a shoe worn by a subject while walking as part of a process of collecting gait data. The insert has force-sensing sensors distributed to define a sensing aperture, and each sensor provides an electrical output signal. Processing apparatus is communicatively coupled with the sensors. The processing apparatus calculates a gait line represented by a series of points, wherein each point is calculated as a spatially-weighted average of samples of the sensor output signals over the sensing aperture. The processing apparatus includes a portable telemetry transmitter worn by the subject. The transmitter is connected to the sensors to receive the sensor output signals, and transmits a radio signal carrying the sensor information. A stationary receiver receives the sensor information in a transmission from the transmitter, and provides the sensor information to a personal computer or similar workstation.

U.S. Pat. No. 6,611,789 to Darley, which is incorporated herein by reference, describes a method including determining, with at least one device supported by a user while the user is in locomotion on foot on a surface, an amount of force exerted by at least one foot of the user on the surface during at least one footstep taken by the user. In another embodiment, a method includes: (a) with at least one sensor supported by a user, monitoring movement of the user while the user is in locomotion on foot; and (b) determining a cadence of the user based upon an output of the at least one sensor. In another embodiment, a method includes: (a) with at least one sensor supported by a user while the user is in locomotion on foot, monitoring movement of the user while the user is in locomotion on foot; and (b) determining a stride length of the user during at least one footstep taken by the user based upon an output of the at least one sensor. In one embodiment, a display has simultaneously displayed thereon at least one determined performance parameter of the user (e.g., pace) and at least one determined variable physiological parameter of the user (e.g., heart rate).

U.S. Pat. No. 6,493,652 to Ohlenbusch et al., which is incorporated herein by reference, describes a method including, in response to movement of a user during at least one footstep taken by the user, generating a signal that experiences changes during a time period that the foot is airborne during the at least one footstep. At least one change in the signal generated after the foot has become airborne and before the foot contacts a surface is identified that is indicative of the foot being airborne during the at least one footstep. In another embodiment, a method includes generating a signal in response to movement of a user during at least one footstep taken by the user. The signal is monitored to determine when the signal has experienced a minimum degree of smoothness for at least a given period of time. In response to determining that the signal has experienced the minimum degree of smoothness for at least the given period of time, it is identified that the foot of the user is airborne.

U.S. Pat. No. 5,406,719 to Potter, which is incorporated herein by reference, describes a cushioning element for use in a shoe. The cushioning element includes four fluid-filled support chambers which are compressible but not collapsible, and which are disposed at different locations throughout the midsole of the shoe. The element also includes four variable volume fluid reservoir chambers which are collapsible to reduce the volume thereof. The reservoir chambers are controllably linked in fluid communication with the support chambers so as to be selectively in full communication with or isolated from the support chambers. By selectively isolating one or more of the reservoir chambers from one or more of the support chambers, and collapsing the isolated chamber, fluid may be moved from one support chamber to another at a different location, thereby increasing the stiffness of the midsole at a selected location.

U.S. Pat. No. 6,430,843 to Potter et al., which is incorporated herein by reference, describes an article of footwear with a dynamically-controlled cushioning system. The cushioning system includes a sealed, fluid-filled bladder formed with a plurality of separate cushioning chambers, and a control system. The control system, which includes pressure sensors and valves, controls fluid communication between the chambers to dynamically adjust the pressure in the cushioning chambers for various conditions such as the activity that the footwear is used in, the weight of the individual and the individual's running style. Certain adjustments can be made while the footwear is in use.

US Patent Application Publication 2003/0009913 to Potter et al., which is incorporated herein by reference, describes an article of footwear with a dynamically-controlled cushioning system. The cushioning system includes a sealed, fluid-filled bladder formed with a plurality of separate cushioning chambers, and a control system. The control system, which includes pressure sensors and valves, controls fluid communication between the chambers to dynamically adjust the pressure in the cushioning chambers for various conditions such as the activity that the footwear is used in, the weight of the individual and the individual's running style. Certain adjustments can be made while the footwear is in use.

U.S. Pat. No. 6,298,314 to Blackadar et al., which is incorporated herein by reference, describes methods for monitoring movement of a person, including using a sensor to generate a signal in response to movement of the person. In one embodiment, a characteristic in the signal is identified that indicates the person is walking or running and, in response to identifying the characteristic, a timer is started. In another embodiment, after the person has begun walking or running, a characteristic in the signal is identified that indicates the person has ceased walking or running and, in response to identifying the characteristic, an action is taken. In another embodiment, a characteristic in the signal is identified that is indicative of a foot of the person being in motion and, in response to identifying the characteristic, a timer is started. In another embodiment, after a foot of the person has been in motion, a characteristic in the signal is identified that is indicative of the foot ceasing to be in motion and, in response to identifying the characteristic, an action is taken. In another embodiment, in response to identifying that the person is not walking or running, a characteristic in the signal is identified that indicates the person has begun walking or running and, in response to identifying the characteristic, an action is taken. In another embodiment, in response to identifying that a foot of the person is stationary, a characteristic in the signal is identified that indicates the foot is in motion and, in response to identifying the characteristic, an action is taken.

U.S. Pat. No. 5,253,435 to Auger et al., which is incorporated herein by reference, describes a bladder assembly for an athletic shoe having at least first and second chambers. The chambers are independently and separately pressure adjustable by the user to conform to different concavity areas of his foot, such as the arch, ankle and metatarsal areas, to thereby enhance fit, comfort and athletic performance. Both chambers are inflatable by the same articulated on-board pump and deflatable by the same on-board depressible plunger. A dial on the lateral side of the upper allows the user to select which of the chambers is to be pressure adjusted, that is, which of the chambers is in pressure communication with the pump and the plunger. When the dial is in a neutral position, accidental inflation or deflation of either chamber is prevented.

U.S. Pat. No. 5,107,854 to Knotts et al., which is incorporated herein by reference, describes an orthopedic exercise chamber such as a slipper including a light-weight, self-contained limb load monitor is disclosed. The limb load sensor circuit provides extended service life for the miniature power supply that is included in the slipper, thereby making the slipper suitable for out-patient use. A fluid-filled plantar chamber that supports the entire load borne by the patient's foot is connected to the sensor circuit, thereby providing improved monitoring of the load being carried by the leg or foot that must be protected from excessive loading.

U.S. Pat. No. 6,646,643 to Templeman, which is incorporated herein by reference, describes techniques for interfacing locomotive 3D movements of a user to a reference in a virtual or remote environment are provided. Initially, a 3D motion of a body portion of a user is sensed as the user takes a gestural pace. This sensing includes the determining of a beginning and an end of the gestural pace taken by the user, the determining of a 3D direction characteristic of the body portion motion during the gestural pace, and the determining of a 3D extent characteristic of the body portion motion during the gestural pace. Next, a 3D direction and extent of motion in the environment corresponding to the determined direction and extent characteristics of the gestural pace is computed. Finally, the computed 3D motion is used to move the reference in the environment.

U.S. Pat. No. 6,539,336 to Vock et al., which is incorporated herein by reference, describes techniques for detecting the loft time, speed, power and/or drop distance of a vehicle, such as a sporting vehicle, during activities of moving and jumping. A loft sensor detects when the vehicle leaves the ground and when the vehicle returns to the ground. A controller subsystem converts the sensed information to determine a loft time. A display shows the recorded loft time to a user of the system. In addition, a speed sensor can detect the vehicle's speed for selective display to the user. A power sensing section informs the user of expended energy, which can be compared to other users. A drop distance sensing unit informs the user of the peak height of a jump, during an airtime. Gaming on the internet is facilitated to connect worldwide sport enthusiasts. The system can be integrated within a shoe and may thus be used by a jogger to evaluate different running shoes. Alternatively, when calibrated, the system is useful to joggers who can gate it to serve as a pedometer. The addition of a capacitor sensor in the heel helps determine average weight. A sensor for skin resistivity may additionally be used to record pulse. The shoe can also record the state of aerobic health for the jogger.

U.S. Pat. No. 6,398,740 to Lavery et al., which is incorporated herein by reference, describes techniques for monitoring items of vital health information including temperature of the plantar aspects of the foot of the human, body weight, blood pressure, pulse rate, blood glucose level and blood oxygen level. The apparatus includes a platform on which the user stands. Included on the platform are a set of heat sensitive signal generating devices. The temperature at predetermined locations on the plantar aspects of the human foot are determined by the signals obtained from the individual heat sensitive, signal generating probes. Other items of vital health information may be obtained by other sensors on the apparatus.

U.S. Pat. No. 5,642,096 to Leyerer et al., which is incorporated herein by reference, describes a shoe for prevention of ulcers in the feet of diabetes patients. The shoe includes a sensor disposed in a contained liquid mass of a hydrocell carried in the shoe inner sole, the sensor being one that detects both pressure and temperature values to which the patient's feet are exposed. The sensor includes a bridge circuit comprised of four piezoresistors arranged in two diagonally arrayed pairs, the resistance of one pair of resistors increasing and the resistance of the second pair decreasing in the presence of an increase in the pressure condition in the hydrocell, the resistance of all the resistors increasing or decreasing responsive to respective increases and decreases of temperature in the hydrocell. Outputs from the bridge circuit indicative of respective pressure and temperature values are acquired by a warning signal generator to operate same to generate a patient discernible warning signal that indicates to the patient a need to take action to avoid continuance of exposure to the condition. A grid array sensor detects localized pressure changes on the bottom of the foot by reducing the resistance between conductors present at the location of the increases pressure. The decreased resistance causes an increase in current flow between the conductors which is detected by a processor which in turn provides an indication of the increased pressure condition.

German Patent Application Publication DE 42 05 796 A1 to Thanscheidt, which is incorporated herein by reference, describes a base for shoes, especially sports shoes, that incorporates inflatable air chambers and an air pump with a valve housing. The housing is connected by a control to any one of the air chambers. The air pump has at least one supply cylinder containing a manually operated piston. The control is formed by an adjusting piston mounted in an adjusting cylinder parallel to the supply cylinder. The end of the adjusting piston has a cam for operating the valve(s) leading to an air chamber. Each valve has a spring loaded valve body guided by a guide pin in a connecting hole in the valve housing wall facing the adjusting cylinder.

The SmartStep® monitoring and biofeedback system (Andante Medical Devices Ltd., Be'er-Sheba, Israel) is a portable, miniature monitoring and biofeedback system for patients undergoing rehabilitation treatment.

SUMMARY OF THE INVENTION

In embodiments of the present invention, a sports system comprises at least one pressure and/or force sensor that measures the force applied to a limb of a subject, a stimulator that provides feedback to encourage the subject to load an optimal target weight profile for the limb, and a control unit that receives the force measurements and drives the stimulator responsive thereto. For some applications, the stimulator comprises an audio stimulator (e.g., a tone generator), a tactile stimulator (e.g., a vibrating unit), and/or a visual stimulator (e.g., a series of LED's, or a computer monitor). Typically, the limb includes a foot of the subject, and the system comprises a flexible insole which comprises the sensor or a portion thereof, and is adapted to be worn inside a shoe of the subject. The system thus provides real-time monitoring of weight bearing during sports activity, and, through the use of closed-loop sensory stimulation, gives the subject continuous feedback and/or feedforward data for improving sports performance.

In some embodiments of the present invention, e.g., for sports training in an indoor sports training facility, the control unit comprises a user interface, which comprises a display. The control unit is configured to display parameters in a limited number of parameter categories, typically no more than four categories, which are typically selected because they are of particular practical usefulness to a sports trainer guiding an athlete. The control unit typically does not display parameters in additional parameter categories, such as those generally displayed in research-oriented rehabilitation systems, which are not of particular usefulness to the sports trainer.

There is therefore provided, in accordance with an embodiment of the present invention, apparatus for improving athletic performance of a user, including:

a flexible insole, adapted for insertion into a shoe, the insole shaped so as to define one or more chambers;

a stimulator; and a control unit, adapted to detect respective pressures in the chambers, and to drive the stimulator to apply a stimulation to the user responsive to the detected pressures and a desired parameter of athletic performance.

In an embodiment, the stimulator includes a stimulator selected from the list consisting of: an audio stimulator, a visual stimulator, and a tactile stimulator.

In an embodiment, the control unit is adapted to drive the stimulator at a given time t responsive to pressures detected within 30 seconds prior to time t.

In an embodiment, the control unit is adapted to drive the stimulator at a given time t responsive to at least one pressure detected greater than 30 seconds prior to time t. In an embodiment, the control unit is adapted to drive the stimulator at a given time t responsive to: (a) at least one pressure detected greater than 5 minutes prior to time t, and (b) at least one pressure detected less than 5 minutes prior to time t. In an embodiment, the control unit is adapted to drive the stimulator at a given time t responsive to at least one pressure detected greater than 15 minutes prior to time t. In an embodiment, the control unit is adapted to drive the stimulator to generate an alarm signal in response to a trend indicative of fatigue of the user.

In an embodiment, the insole is shaped so as to define three or more chambers (e.g., exactly three chambers).

In an embodiment, the apparatus includes a control element, adapted to cause the control unit to:

in a first mode of operation, drive the stimulator responsive to pressures in a first set of two of the chambers, and in a second mode of operation, drive the stimulator responsive to pressures in a second set of two of the chambers, wherein the first set is not identical to the second set.

In an embodiment, the control unit is adapted to detect pressure in a single chamber of the insole. In an embodiment, the control unit is adapted to drive the stimulator responsive to a desired cadence.

In an embodiment, the control unit is adapted to detect pressure in exactly two chambers of the insole. In an embodiment, the two chambers are aligned in the insole to correspond to a hindfoot and a forefoot of the user. In an embodiment, the two chambers are aligned in the insole to correspond to a medial portion and a lateral portion of the foot of the user.

There is further provided, in accordance with an embodiment of the present invention, apparatus for use during activity of a user, including:

a flexible insole, adapted for insertion into a shoe, the insole shaped so as to define one or more pressure-sensing chambers and one or more pressure-regulation chambers; and a control unit, adapted to detect at least one pressure in the pressure-sensing chambers, and to modulate a pressure in the pressure-regulation chambers in response thereto.

In an embodiment, the insole includes first and second layers, wherein the first layer includes the pressure-sensing chambers, and wherein the second layer includes the pressure-regulation chambers. In an embodiment, the first layer is disposed in the insole above the second layer. In an embodiment, the first layer is disposed in the insole below the second layer.

There is also provided, in accordance with an embodiment of the present invention, apparatus for use during activity of a user, including:

a flexible insole, adapted for insertion into a shoe, the insole shaped so as to define one or more pressure-sensing-and-regulation chambers; and a control unit, adapted to detect at least one pressure in the one or more chambers, and to modulate a pressure in the chambers in response thereto.

In an embodiment, the one or more pressure-sensing-and-regulation chambers include a single pressure-sensing-and-regulation chamber.

In an embodiment, the one or more pressure-sensing-and-regulation chambers include two pressure-sensing-and-regulation chambers.

The present invention will be more fully understood from the following detailed description of embodiments thereof, taken together with the drawings, in which:

DETAILED DESCRIPTION OF EMBODIMENTS

Figure 1A:
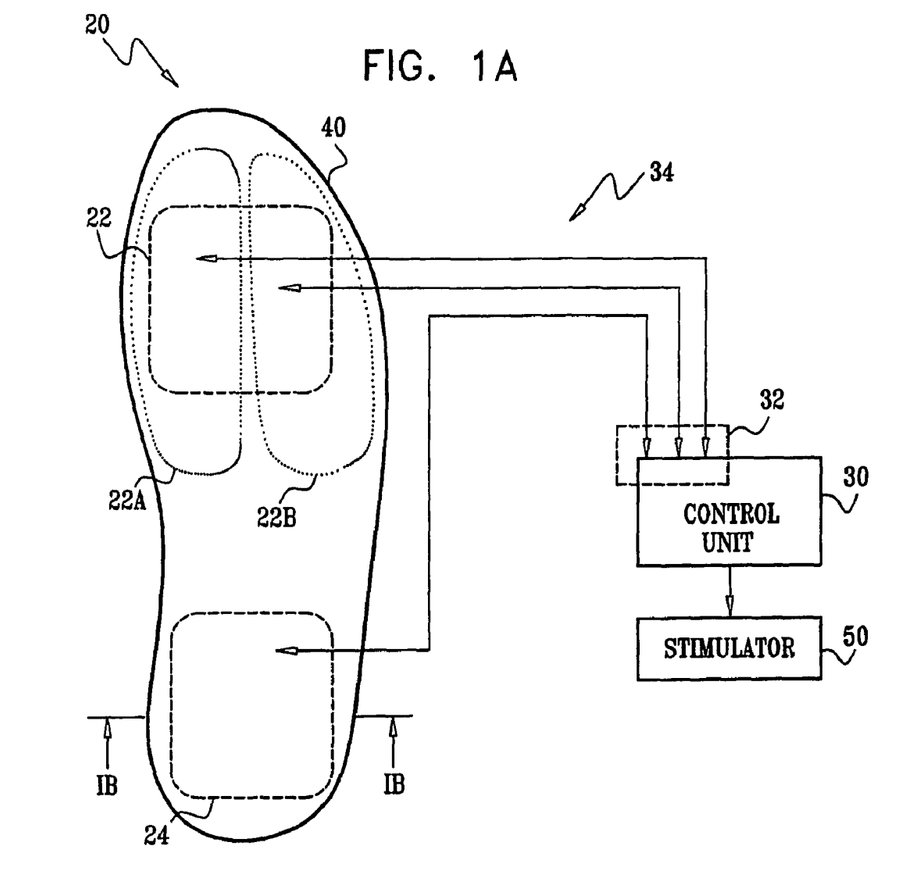
FIGS. 1A and 1B are schematic illustrations of a system for sensing and/or controlling aspects of a sports shoe, in accordance with an embodiment of the present invention.
Figure 1B:
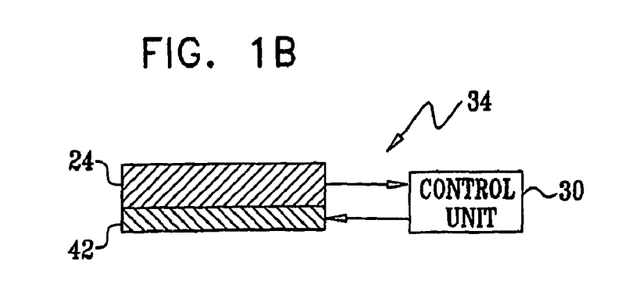

Reference is now made to FIGS. 1A and 1B, which are schematic illustrations of a system 20 for sensing and/or controlling an insole 40 placed in a sports shoe (not shown), in accordance with an embodiment of the present invention.

In an embodiment, insole 40 comprises two chambers: a forefoot chamber 22, and a hindfoot chamber 24. Alternatively, insole 40 comprises two chambers: a medial chamber 22A and a lateral chamber 22B. Alternatively, insole 40 comprises three chambers: hindfoot chamber 24, and medial and later chambers 22A and 22B. Alternatively, insole 40 comprises a plurality of chambers in a different configuration from that shown in FIG. 1 (for example, four chambers, five chambers, or one of the configurations shown in the references described in the Background section of the present patent application).

System 20 typically comprises a control unit 30, which in turn comprises one or more pressure sensors (not shown). Control unit 30 is coupled via tubes or other fluid couplers 34 to the chambers and is adapted to measure fluid pressure in the chambers in real time during an athlete's activity (e.g., running). The chambers are typically filled with a gas (e.g., air), but may alternatively be filled with a liquid (e.g., water). For some applications, other techniques for sensing pressure in various portions of insole 40 are used in addition to or instead of those described with respect to the embodiment shown in FIG. 1. Some suitable pressure sensors for use in practicing these other techniques are described in references cited in the Background section of the present patent application.

In an embodiment, insole 40 comprises three or more chambers, and a control element 32 for allowing the control unit to measure pressure in a first set of two or more of the chambers during a first mode of operation, and to measure pressure in a second, different, set of two or more of the chambers during a second mode of operation. For example, during the first mode of operation, control unit 30 may measure the pressure in chambers 22 and 24, while in the second mode of operation, the control unit may measure the pressure in chambers 22A and 22B. As appropriate for a given application, the various modes of operation may last for an entire exercise session, or for a portion thereof (e.g., in alternating ten-minute modes of operation.

For some applications, control element 32 comprises a mechanical control element (e.g., one or more manually-operated or automatically-actuated switches or valves), whereby control unit 30 typically comprises fewer pressure sensors than the total number of chambers sensed during the various modes of operation. Alternatively or additionally, control element 32 is embodied in software in the control unit, such that the control unit analyzes the data from selected chambers depending on the mode of operation selected.

In an embodiment, control unit 30 analyzes an aspect of the gait of the athlete, and actuates a stimulator 50 to generate a stimulation in real time in response to the analysis, in order to improve the aspect of the gait. For some applications, if the aspect of the gait recurs over at least several paces, then the stimulator is actuated, but if the aspect of the gait occurs only once, then it is classified as not justifying a response (e.g., because the runner was avoiding an obstacle). Although control unit 30 and stimulator 50 are shown in FIG. 1A as being physically separated from insole 40, for some applications, one or both are physically integrated into the body of insole 40.

For some applications, the stimulator is activated in response to determining a sub-optimal relationship between the timing and/or magnitude of a pressure increase in one of the chambers and the timing and/or magnitude of a pressure increase in another one of the chambers. For example, gait analysis for a particular runner may reveal that the pressure in chamber 24 rises in close temporal proximity to the rise in pressure in chamber 22, indicating that the runner is driving her foot into the ground during each pace, rather than landing on the heel and rolling to the forefoot. Analysis may reveal for another runner that he has a tendency to run to some extent on his toes, thereby compromising performance. Analysis of still another runner's gait may reveal pronation or supination of the foot throughout an exercise session, or in portions thereof. (It is to be understood that although some examples are described herein with respect to running, this is by way of illustration and not limitation.)

In an embodiment, a desired range of values is designated for a parameter that may be measured or calculated based on analysis of the runner's gait. The parameter may be, for example, a timing parameter indicating the duration between a pressure change in one chamber and a pressure change in another chamber. Alternatively or additionally, the parameter may be a magnitude parameter indicating, for example, the peak pressure in one or more of the chambers. If the parameter is determined to be outside of the desired range (typically during at least several paces during an exercise session), then stimulator 50 generates a stimulation indicative of the deviation each subsequent time that the parameter stays out of the desired range. Typically, the stimulation is different when the value is below the desired range compared to when the value is above the desired range, in order to help the runner to place and maintain the parameter in the desired range. For example, one beep may indicate that the value is too low, while two beeps may indicate that the value is too high. Alternatively or additionally, an aspect of the stimulation is varied in response to an extent of the deviation from the desired range. For example, an audio tone may increase in volume in correspondence with the extent of the deviation. For some applications, the runner is trained how to respond to the various stimulations, while for other applications, the runner naturally varies various aspects of her gait until the parameter value is in the desired range, whereupon the stimulation stops.

For some applications, gait analysis is used to spur the runner on to greater levels of performance, e.g., by attaining a correct cadence at various portions of a 800 meter race.

In an embodiment, control unit 30 detects the onset of fatigue based on long-term (e.g., >5 minutes) changes in gait parameters. For example, a gradual increase in impact force may be used as an indicator of excessive fatigue, and may trigger an alarm signal by stimulator 50 to prevent possible injury.

In combination with or separately from the embodiments described hereinabove, control unit 30 reduces impact forces applied to the runner's foot by performing dynamic sensing of pressure changes and/or magnitudes in one or more of the chambers, and adapting pressures applied to the foot in real-time in responsive thereto. For example, control unit 30 may cause air to be pumped into some or all of the chambers in response to detecting a transition between sitting and walking, walking and running, or running and jumping. Similarly, upon detecting a transition from running to walking, the control unit may cause air to be released from the chambers, at least in part.

For some applications, the same chambers which are used for facilitating the pressure measurements by control unit 30 are inflated or deflated by control unit 30 in response to the pressure measurements.

For some applications, control unit 30 measures the pressure in one or more chambers, and inflates or deflates one or more other chambers in response to the pressure measurements. For example, FIG. 1B shows the IB cross-section of insole 40 of FIG. 1A. In an embodiment, insole 40 comprises two layers, a sensing layer (e.g., comprising chamber 24), and a pressure-regulation layer (e.g., comprising a pressure-regulation chamber 42 whose pressure is regulated by control unit 30). As appropriate, chamber 42 may extend over generally all of insole 40, or over only a portion of insole 40 (e.g., the hindfoot or forefoot region).

Figure 2:
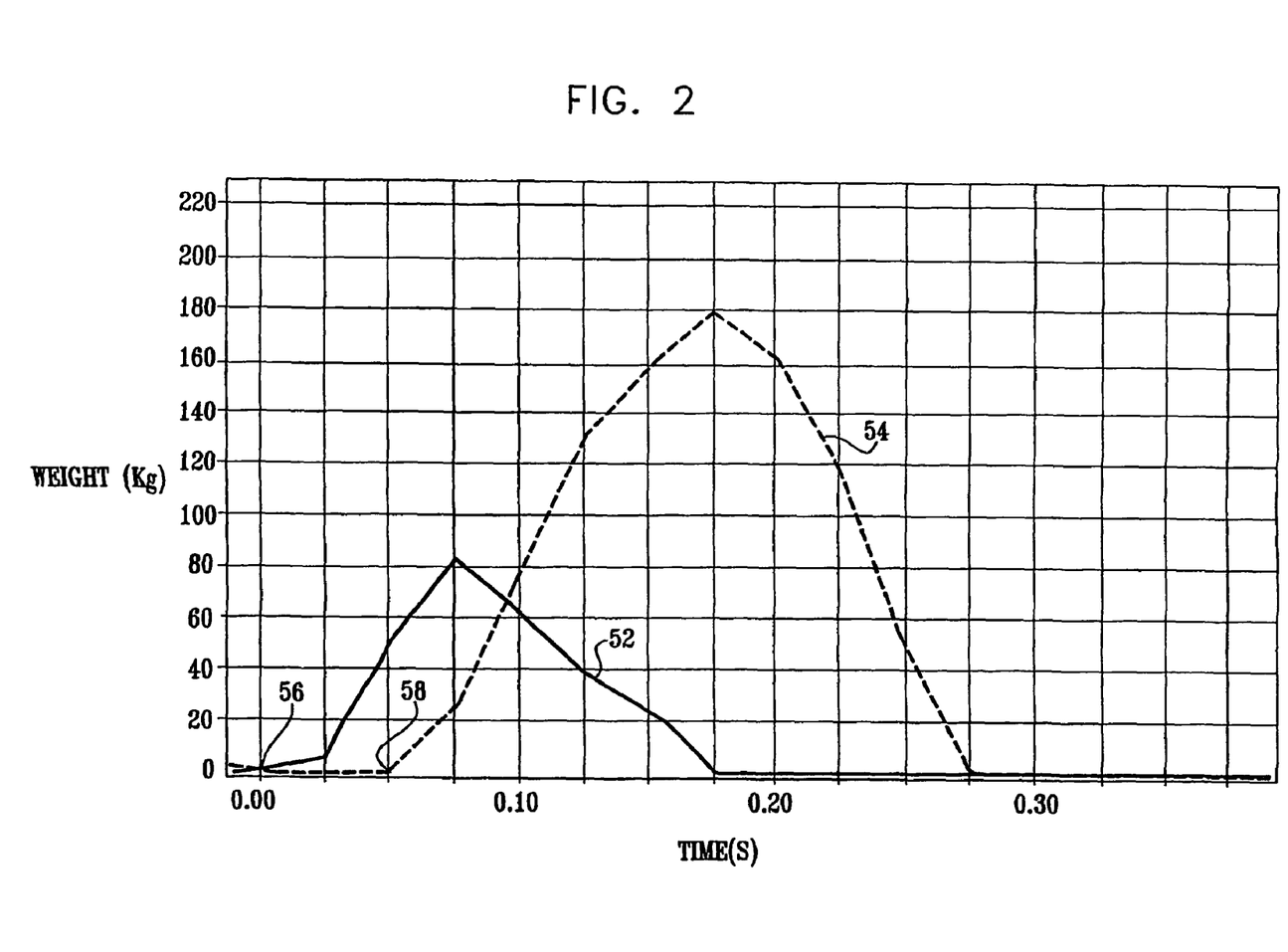
FIG. 2 is a graph showing typical forefoot and hindfoot plantar pressure data under fresh running conditions, acquired and analyzed in accordance with an embodiment of the present invention.
Figure 3:
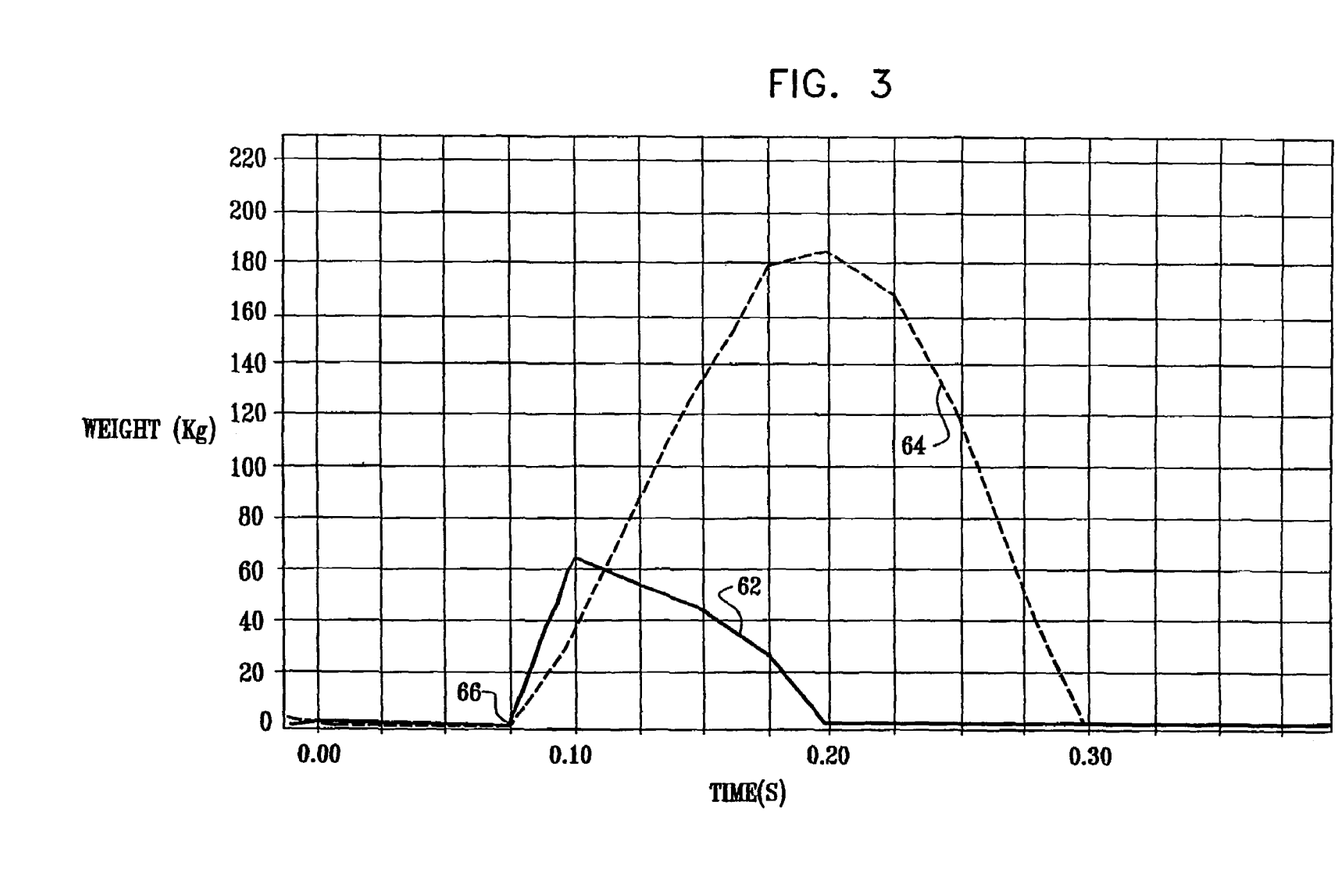
FIG. 3 is a graph showing typical forefoot and hindfoot plantar pressure data under fatigued running conditions, acquired and analyzed in accordance with an embodiment of the present invention.

FIGS. 2 and 3 are graphs showing typical plantar pressure data under fresh and fatigued running conditions, respectively, acquired and analyzed in accordance with an embodiment of the present invention. In this study, a two chambered embodiment of the present invention was used to dynamically determine plantar pressure changes that occurred during running. The embodiment comprises a flexible insole shaped to define a forefoot chamber and a hindfoot chamber, each coupled to a respective single pressure sensor. The flexible insole was worn inside a shoe of the subject and thus provided real-time monitoring of weight bearing during running. A control unit was configured to collect plantar pressure data at a rate of 40 Hz, although the scope of the present invention includes the use of a higher rate (e.g., in the range of 200 Hz), as well. The apparatus was calibrated using force measurements taken using a force plate. (For typical use out of the laboratory, this is not generally performed.)

Data were collected from a runner running on a treadmill at a speed of 12 km/hr. The runner warmed up for 10 minutes at a speed of 10 km/hr before being fitted with the two-chambered insole provided by this embodiment of the present invention. The apparatus was then used to collect continuous data until the subject indicated that he was exhausted and could not continue running.

FIG. 2 shows a typical hindfoot and forefoot plantar pressure of a fresh subject, during the beginning of running. Solid line 52 represents the pressure detected by the hindfoot sensor as a function of time. Dashed line 54 represents the pressure detected by the forefoot sensor as a function of time. The graph shows that the hindfoot pressure begins to increase at point 56 while the forefoot pressure begins to increase at point 58, indicating that the heel contacts the ground approximately 0.05 seconds before the forefoot contacts the ground.

FIG. 3 shows the plantar pressure of a subject exhibiting fatigue. Solid line 62 represents the pressure detected by the hindfoot sensor as a function of time. Dashed line 64 represents the pressure detected by the forefoot sensor as a function of time. The graph shows that the hindfoot and forefoot pressures begin to increase at the same time (i.e., point 66), indicating that the hindfoot and the forefoot contact the ground generally simultaneously.

It is seen that as the subject fatigued, the time interval between initial forefoot contact and initial hindfoot contact decreased. This indicates that the subject changed his running style from heel strike to midfoot strike as he fatigued.

It is to be understood that embodiments of the present invention described with respect to sports training may be adapted for rehabilitation.

For some applications, other pressure sensing techniques known in the art are utilized in place of or in combination with the methods utilizing chambers described hereinabove.

The present invention includes and/or may be practiced in combination with techniques and apparatus described in U.S. Provisional Patent Application 60/526,814, filed Dec. 3, 2003, U.S. Pat. No. 4,745,930 to Confer, U.S. Pat. No. 5,033,291, to Podoloff et al., U.S. Pat. No. 4,426,884 to Polchaninoff, U.S. Pat. No. 4,813,436 to Au, U.S. Pat. Nos. 4,734,034 and 4,856,993 to Maness et al., U.S. Pat. No. 3,881,496 to Vredenbregt et al., U.S. Pat. No. 3,974,491 to Sipe, U.S. Pat. No. 3,791,375 to Pfeiffer, U.S. Pat. No. 6,273,863 to Avni et al., PCT Publication WO 04/008095 to Avni et al., PCT Publication WO 01/36051 to Avni, U.S. Pat. No. 6,360,597 to Hubbard, Jr., U.S. Pat. No. 6,611,789 to Darley, U.S. Pat. No. 6,493,652 to Ohlenbusch et al., U.S. Pat. No. 5,406,719 to Potter, U.S. Pat. No. 6,430,843 to Potter et al., US Patent Application Publication 2003/0009913 to Potter et al., U.S. Pat. No. 6,298,314 to Blackadar et al., U.S. Pat. No. 5,253,435 to Auger et al., U.S. Pat. No. 5,107,854 to Knotts et al., U.S. Pat. No. 6,646,643 to Templeman, U.S. Pat. No. 6,539,336 to Vock et al., U.S. Pat. No. 6,398,740 to Lavery et al., U.S. Pat. No. 5,642,096 to Leyerer et al., and German Patent Application Publication DE 42 05 796 A1 to Thanscheidt, which are incorporated herein by reference.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for improving athletic performance of a user, comprising:
    a flexible insole, adapted for insertion into a shoe, the insole shaped so as to define at least two pressure-sensing chambers, said at least two pressure-sensing chambers comprising a forefoot chamber and a hindfoot chamber;
    a stimulator; and
    a control unit, adapted to detect pressures in the forefoot and hindfoot chambers as a function of time and to measure a duration between a first time, when said pressure detected in said hindfoot chamber begins to increase, and a second time, when said pressure detected in said forefoot chamber begins to increase, and to drive the stimulator to apply a stimulation to the user responsive to a relationship between the duration and a desired parameter of athletic performance.

2. The apparatus according to claim 1, wherein the stimulator comprises a stimulator selected from the list consisting of: an audio stimulator, a visual stimulator, and a tactile stimulator.

3. The apparatus according to claim 1, wherein the control unit is adapted to drive the stimulator to generate an alarm signal in response to a trend indicative of fatigue of the user.

4. The apparatus according to claim 1, wherein the insole is shaped so as to define three or more chambers.

5. The apparatus according to claim 4, wherein the insole is shaped to define exactly three chambers.

6. The apparatus according to claim 1 and wherein:
said flexible insole is also shaped so as to define one or more pressure-regulation chambers; and
said control unit is also adapted to modulate a pressure in at least one of the pressure-regulation chambers.

7. The apparatus according to claim 6, wherein the insole comprises first and second layers, wherein the first layer comprises the pressure-sensing chambers, and wherein the second layer comprises the pressure-regulation chambers.

8. The apparatus according to claim 7, wherein the first layer is disposed in the insole above the second layer.

9. The apparatus according to claim 7, wherein the first layer is disposed in the insole below the second layer.

* * * * *